H. B. FARGO.
Harrow-Teeth.

No. 153,430. Patented July 28, 1874.

Witnesses

Inventor
Henry B. Fargo

UNITED STATES PATENT OFFICE.

HENRY B. FARGO, OF FOND DU LAC, WISCONSIN.

IMPROVEMENT IN HARROW-TEETH.

Specification forming part of Letters Patent No. 153,430, dated July 28, 1874; application filed May 23, 1873.

*To all whom it may concern:*

Be it known that I, HENRY B. FARGO, of Fond du Lac, State of Wisconsin, have invented a new and Improved Harrow-Tooth, of which the following is a description:

My invention relates to the construction of the tooth itself of triangular form, as shown more fully hereinafter.

Figure 1:
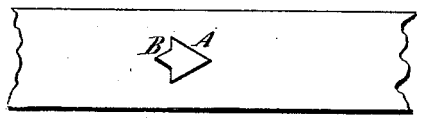
Figure 2:
Figure 3:
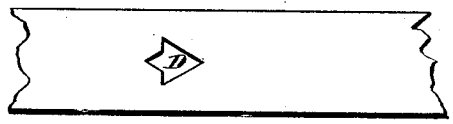
Figure 4:
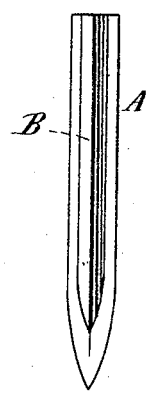
Figure 5:
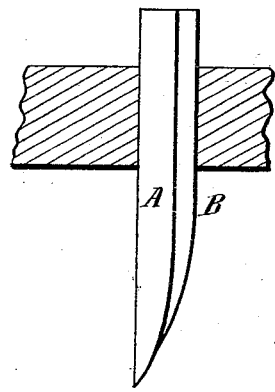

Figure 1 is a view of the top end of the tooth. Fig. 2 is a front view of the tooth. Fig. 3 is a view of a section of the harrow bar or beam, showing the peculiar hole wherein the tooth is placed and held. Fig. 4 is a rear view of the tooth. Fig. 5 is a view of sectional part of harrow, showing a tooth set in the bar.

A is the harrow-tooth, constructed of steel or iron, and made V-shaped in front, with lower end pointed from the rear. The tooth is made of steel or other metal. B is a narrow V-shaped tongue or ridge raised on the center of the back of the tooth, running the entire length of the tooth down to where it commences to joint. This completes the formation of the tooth, and, in addition to giving it greater strength, constitutes a rough side or base, against which the grain of the wood of the harrow-beam binds hard and close. D is the mortised hole in the harrow-beam, made in shape to receive the tooth above described, and in a V-shaped harrow is so cut that the tooth, instead of setting straight or parallel with the grain of the wood, is placed slightly sidewise, so as to be parallel with the line of draft.

I am aware that a harrow-tooth having three or more concave ribs, and corresponding front and rear ridges to give strength, &c., has been used before, and is well known, and I, therefore, do not lay claim to it; but What I do claim as new, and desire to secure by Letters Patent, is—

The tooth A, of triangular form, as shown, and having a narrow V-shaped tongue or ridge, B, raised on the center of the back, running lengthwise of the tooth down to where it commences to curve forward, substantially as and for the purposes set forth.

HENRY B. FARGO.

Witnesses:
C. K. PIER,
J. W. JOHNSON.